United States Patent
Falvert et al.

[15] 3,686,492
[45] Aug. 22, 1972

[54] METHOD AND DEVICE FOR SIMULATING TRAFFIC

[72] Inventors: Daniel Falvert, Antony; Georges Giralt, Flourens Par Balma; Jean Clot, Montaudran; Gerard Authie, Toulouse, all of France

[73] Assignee: Compagnie Generale D'Automatisme, Paris, France

[22] Filed: March 6, 1970

[21] Appl. No.: 17,104

[30] Foreign Application Priority Data

March 6, 1969 France.....................6906330

[52] U.S. Cl. .............235/184, 235/150.24, 235/197
[51] Int. Cl.............................G06f 15/48, G06g 7/76
[58] Field of Search.........235/150, 150.24, 184, 185, 235/193, 197; 307/109–110; 320/1; 340/23

[56] References Cited

UNITED STATES PATENTS

| | | |
|---|---|---|
| 3,345,503 | 10/1967 | Auer, Jr.................235/150.24 |
| 3,546,490 | 12/1970 | Sangster.....................320/1 X |
| 3,141,968 | 7/1964 | Stubbs et al. ..............235/185 |
| 3,484,673 | 12/1969 | Strobel..................307/109 X |

*Primary Examiner*—Charles E. Atkinson
*Assistant Examiner*—Jerry Smith
*Attorney*—Craig, Antonelli & Hill

[57] ABSTRACT

The invention concerns the simulation of vehicle traffic along one or several paths. It is a method and device for the simulation of traffic in which an electrical analogy is used. Each section of track is represented by a capacitor. The number of vehicles in a section is represented by the charge of the capacitor, the density in a section is represented by the voltage on the capacitor, the flow in a section is represented by the current from one capacitor to the next. The invention is used, in a preferred application, for studying road traffic movements.

8 Claims, 7 Drawing Figures

METHOD AND DEVICE FOR SIMULATING TRAFFIC

The present invention relates to a method for simulating traffic, for example, the traffic of motor vehicles either on one road or on several roads which may intersect. The present invention further relates to a device designed for carrying out this method, represent current representative.

It is characteristic of the present invention that the traffic is assimilated to a flow of electrical charges controlled by continuous equations.

The present invention is concerned with a device and method for simulating the traffic of motor vehicles on a network of streets, or highways, and is characterized in that each street or road is assumed to be subdivided into sections; for each section there is provided an electrical capacitor having a certain capacity representative of the capacity in vehicles of the section being considered; for the number of vehicles within one section, the charge of the condenser will represent this same section; for the concentration of vehicles in one section, a voltage on the condenser will represent this section; and for the flow from one section into the adjacent section, the electric current which circulates between the condensers will be representative.

The present invention is directed to and concerned with a device designed for simulating the traffic of motor vehicles on a network of highways, by using the method in which there is simulated a linear law between the speed and the concentration of vehicles in each section, characterized in that, for the purpose of making charges circulate from one condenser to the other, each having a first terminal grounded, it comprises between the second terminals of two condensers representing two consecutive sections, a first voltage frequency converter furnishing a frequency signal $f_1$ which is proportional to the voltage of the upstream condenser, a first trigger circuit in operative engagement with the aforementioned first converter for the purpose of furnishing impulses calibrated to the frequency $f_1$, these impulses being fed to the condenser downstream thereof by means of a first resistor and a first input of a first AND circuit, a second input of which receives a voltage $V_s$ proportional to the saturation concentration of the section below, a second voltage frequency converter connected to the condenser downstream and further receiving the voltage $V_s$ and furnishing a frequency signal $f_2$ which is proportional to the difference between the voltage $V_s$ and the voltage of the condenser downstream, a second trigger circuit furnishing impulses calibrated to the frequency $f_2$ to a first input of a second AND circuit, a second input of which is connected to the condenser upstream thereof by means of a second resistor and the output of which is connected to ground.

It is an object of the present invention to provide a novel method and device for the simulation of vehicle traffic using electrical components and their characteristics.

It is another object of the present invention to provide a method and device of the type described which is governed by a linear or a non-linear relationship of speed to concentration of the vehicles.

These and other objects features and advantages of the present invention will become apparent from the following detailed description thereof when taken with the accompanying drawings which illustrate two exemplary embodiments of the invention, and wherein.

The principle of the present invention is as follows — The road on which it is desired to simulate the traffic is subdivided into sections or portions each of which represents a given length of the road. Each portion or section has a certain capacity; in other words, it is adapted to accumulate a certain number of vehicles thereon per unit of length.

In the proposed electrical homolog, an electrical condenser represents this capacity with respect to vehicles. Also, in the proposed homolog, the quantity of electricity stored in the condenser corresponds to the number of vehicles present in one section. The concentration of vehicles within this section (ratio of the number of vehicles in the section to the capacity thereof) corresponds to the voltage on the condenser (electrical voltage = electric charge: electrical capacity), and the maximum concentration of vehicles (saturation concentration) corresponds to the saturation voltage at the condenser. The flow of vehicles within one section corresponds to an electrical current which circulates between a condenser and the next-adjoining condenser placed downstream thereof. The electric current is a charge value per unit of time; hence, this is the image of a flow.

Figure 1:
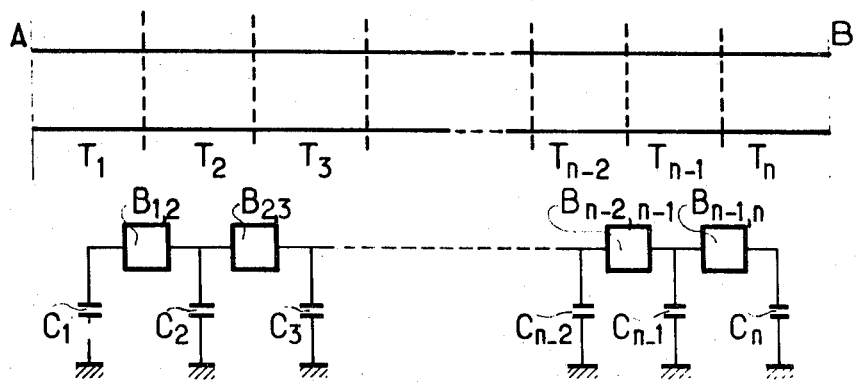
FIG. 1 is an analogical diagram according to the present invention.

The device designed for carrying out the method mentioned above is schematically illustrated in FIG. 1. A path AB subdivided into $n$ sections $T_1$ to $T_n$ is shown in an analogical manner by an electric circuit having $n$ condensers $C_1$ to $C_n$ interconnected by circuits $B_{1,2}$; $B_{2,3}$ ... etc., $B_{n-1,n}$ assuring the flow of charges from one condenser to the other according to a system determined by the circulation function desired, as discussed hereinbelow.

The line of propagation of the charges must have the following properties:

1. It must be uni-directional since the vehicles of a given path will be displaced only in a single direction.

2. The number of charges being injected into the line must be maintained constant. As a matter of fact, on a given portion of the path which has no intersection, no vehicle enters, nor exits, unless it is at the ends thereof. In the electrical homolog, the number of charges extracted from a condenser must correspond to the number of charges being injected into the following condenser.

3. When the line AB is isolated (does not flow onto another path), the charges being injected at A must be accumulated in the condenser $C_n$ until the voltage thereof reaches the saturation voltage, and must thereafter be accumulated in the condenser $n - 1$, until saturation sets in, and so forth.

4. When the path AB is such that the last condensers are saturated if one extracts the charges at B, the condenser $C_n$ must be discharged first, the condenser $C_{n-1}$ must begin to be discharged with a certain delay, then the condenser $C_{n-2}$, and so forth.

5. The saturation voltage on the condensers which is the image of the concentration of the corresponding portions or sections must remain between zero and the previously defined saturation voltage.

6. The flow of the charges along the line must be made according to the known laws of traffic along a street, or highway.

Figure 2:
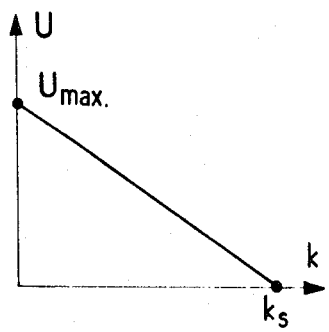
FIG. 2 is a diagram of a linear law of speed as a function of the concentration of traffic.

It is assumed that $k$ is the concentration of vehicles on a road section; $k_s$ the saturation concentration; $q$ the flow of vehicles on the section; and $U$ the mean speed of the vehicles on this road. Experience has shown that, in a first approximation, the speed $U$ may be expressed for the ideal flow conditions (no unforeseen obstacles) by means of a linear law (the diagram of FIG. 2) as follows:

$$U(k) = (U_{max}/k_s)(k_s - k)$$

wherein $U_{max}$ is a constant depending upon the characteristics of the road and of the vehicles. The flow takes the following form since $q = kU$:

$$q(k) = (U_{max}/k_s) k (k_s - k)$$

Figure 3:
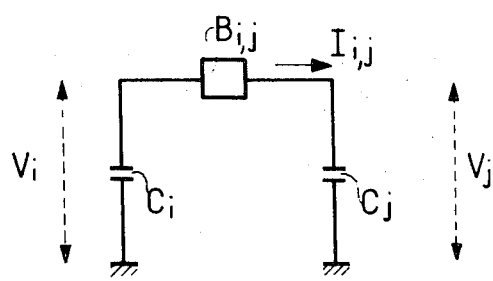
FIG. 3 is an electrical analogical diagram of a path section.

Let us consider the section of the line represented in FIG. 3 as analogous to one road section comprising the condensers $C_i$ and $C_j$ ($C_j$ downstream from $C_i$). For permanent operation, it is necessary that $V_i = V_j = V$, where $V_i$ and $V_j$ are the voltages across the condensers $C_i$ and $C_j$, respectively, and $$I_{ij} = AV(V_s - V) \quad (1)$$

wherein $I_{ij}$ is the current flowing between the condensers $C_i$ and $C_j$, $V_s$ is a saturation voltage corresponding to the saturation concentration $k_s$ and $A$ is a function of the system parameters. In or during the transitory operation, $V_i$ and $V_j$ are different, and one may adopt the law $$I_{ij} = AV_i(V_s - V_j) \quad (2)$$

This clearly indicates that the flow is a function of the speed in the downstream zone and of the concentration in the upstream zone.

If the downstream zone is saturated, $V_j = V_s$ and the flow is zero, which is verified by the equation (2) above.

Figure 4:
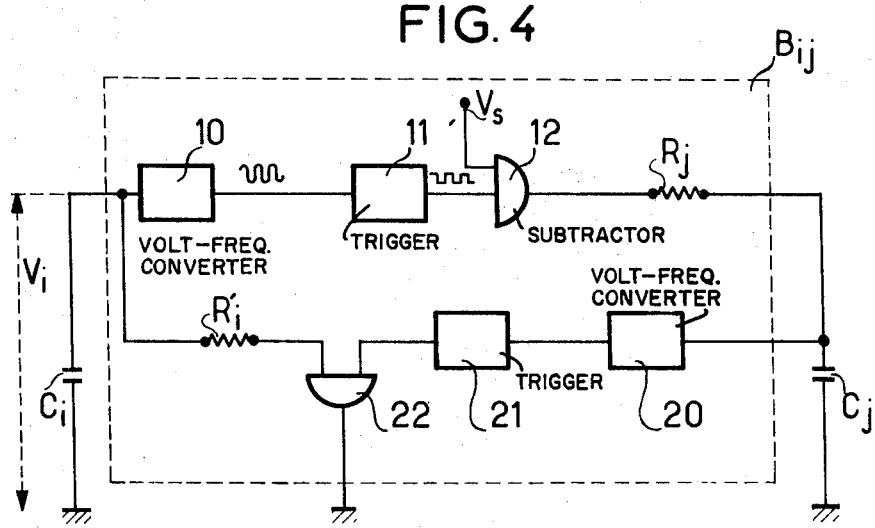
FIG. 4 illustrates a circuit for the transfer of charges adapted to a linear law of the flow-concentration characteristic (voltage-current)

The circuit $B_{ij}$ represented schematically in FIG. 4 provides for the certain transfer of the charges from a condenser $C_i$ to a condenser $C_j$ in accordance with a law of the type $I_{ij} = AV_i(V_s - V_j)$, the condenser $C_j$ being the condenser immediately adjacent to and downstream of the condenser $C_i$ ($j = i + 1$). It comprises a voltage frequency converter 10 receiving the voltage $V_i$ at the terminals of $C_i$ and furnishing a frequency signal $f_i = \alpha_{ij} V_i$, wherein $\alpha_{ij}$ is a given constant. A trigger 11 furnishes from the aforementioned frequency signal calibrated impulses having a duration $\tau_i$ emitted at the frequency $f_i$. These impulses are applied over a first input of a subtractor circuit 12, a second input of which is connected to a potential $V_s$ (corresponding to the saturation concentration $k_s$ of the section). The output of the gate is connected to the condenser $C_j$ by means of a resistor $R_j$.

The mean or average current $I_{ij}$ injected in $C_j$ is equal to $I_{ij} = f_i \tau_i (V_s - V_j/R_j)$, or, since $f_i = \alpha_{ij} V_i$, $$I_{ij} = (\tau_i \alpha_{ij}/R_j) V_i (V_s - V_j)$$

The capacity $C_j$ is charged therefore according to the equation (2).

In order to obtain a discharge of the condenser $C_i$ according to the same law (so as to maintain a conservation of the total quantity of electricity of the section), use is made of elements analogous to those described above, namely a voltage frequency converter 20 connected to the condenser $C_j$ furnishes a frequency signal $f_j = \alpha_{jl} (V_s - V_j)$. This signal is operated on by a trigger 21 in a manner such as to form impulses having equal durations $\tau_j$. These impulses are applied to a first input of an AND circuit 22, a second input of which is connected to the condenser $C_i$ by means of a resistor $R'_i$. The output of the AND gate circuit 22 is connected to ground. In this manner the mean discharge current of the condenser is $$I_{ji} = (\tau_j f_j V_i/R'_i)$$

and since $f_j = \alpha_{jl} (V_s - V_j)$ $$I_{ji} = (\tau_j \alpha_{jl} V_i/R'_i)(V_s - V_j).$$

The desired equality of the charge current of condenser $C_j$ and of the discharge current of condenser $C_i$ imposes the condition $(\alpha_{ij}/R_j) = \alpha_{jl} R'_i$, which is easily obtainable by adjustment of the resistors of the converters and of the different parameters of the circuits.

The block $B_{ij}$ which has been described above renders it possible to assure, in the case of a linear speed-concentration relationship, the flow of the charges according to the chosen linear law.

Figure 5:
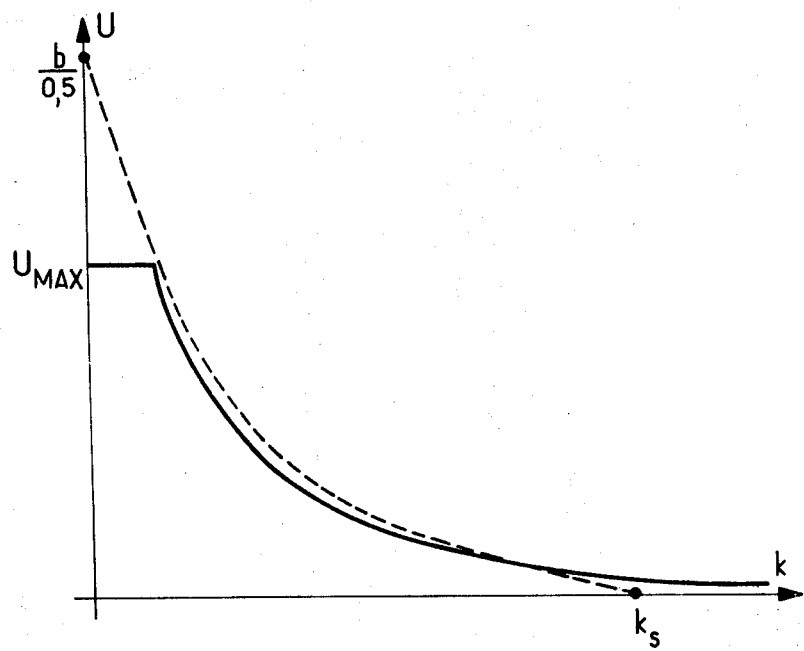
FIG. 5 is a diagram of a logarithmic law of speed as a function of the concentration.

In the modified embodiment of the present invention which will be described hereunder, the speed-concentration relationship is chosen to be different from the linear law. Instead, a law is chosen which is more realistic, namely a logarithmic variation of the speed as a function of the concentration, which is expressed by the formula $U = U_o \log (k_s/k)$, wherein $U_o$ is a constant. This function must be cut-off at $U - U_{max}$ in order to avoid the divergence at weak concentrations. The solid curve in FIG. 5 illustrates this law.

In order to have a single function, one may replace the logarithmic law by a hyperbolic law of the form:

$$U = b(k_s - k/0.5k_s + k),$$

wherein $b$ is a coefficient. For the entire useful range, the hyperbolic curve (shown in dashed lines in FIG. 5) is practically blended with the logarithmic curve. In permanent operation, the flow $q$ is thus expressed as a function of the concentration by the relation:

$$q = bk(k_s - k/0.5 k_s + k)$$

The generator of the equivalent analogical circuit must therefore conform to the law:

$$i = b(V(V_s - V)/0.5 V_s + V)$$

The current $I_{ij}$ of a section comprised between two condensers $C_i$ and $C_j$ will be expressed for the case of the transitory operation in an analogous manner to that which has been mentioned hereinabove:

$$I_{ij} = b(V_i(V_s - V_j)/0.5 V_s + V_j)$$

The electrical circuit used for setting in operation this function comprises for each section two distinct modular elements. The first modular element which will hereinafter be designated as module $M_1$ serves for transferring the charges from a condenser $C_i$ to the condenser $C_j$ adjacent to condenser $C_i$ and downstream from the latter. The second modular element, or module $M_2$, serves for simulating the law of propagation.

Figure 6:
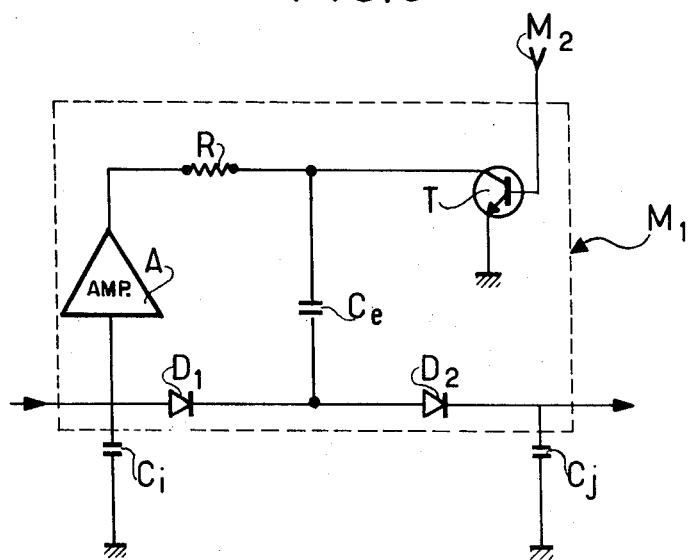
FIG. 6 is a schematic diagram of a modular element designed for the transfer of the charges from one section to the adjacent section.

One embodiment of the module $M_1$ is shown in FIG. 6 within the dashed lines. The module $M_1$ comprises two diodes $D_1$ and $D_2$ disposed in series and with the same direction of conduction between condenser $C_i$ and condenser $C_j$, the direction of conduction extending from the upstream condenser $C_i$ to the downstream condenser $C_j$. It further comprises an amplifier A having an amplification $g$, whose input is connected with the condenser $C_i$ and whose output is connected by means of a resistor R to the collector of a transistor T whose emitter is grounded. Finally, a condenser $C_e$ having a much smaller capacity than those of $C_i$ and $C_j$ is connected on the one hand to the common point at the diodes $D_1$ and $D_2$, and on the other hand to the common point at the resistor R and at the transistor T.

The operation of the device proposed by the present invention is as follows. Let it be assumed that the transistor T is blocked and that a voltage $V_i$ be applied to the condenser $C_i$. The condenser $C_e$ is charged until the voltage thereof at the terminals is $gV_i$. If the transistor is placed in the state of conduction, the capacitor $C_e$ will be discharged along the circuit path $C_i$–$D_1$–$C_e$–T, thus removing a fraction of the charge which is accumulated by $C_i$. When the transistor T is again blocked, this charge is transferred into condenser $C_j$ by the circuit path $C_j$–$D_2$–$C_e$. The transit time of the charges is a function only of the time during which T is conductive.

The speed of flow of the vehicles from the zone $i$ to the zone $j$ is in the aforementioned hyperbolic law of the following form $$U_{ij} = k_s - k_j/0.5 k_s + k_i$$

The transit time is hence proportional to the quantity $$0.5 k_s + k_i/k_s - k_j$$

Figure 7:
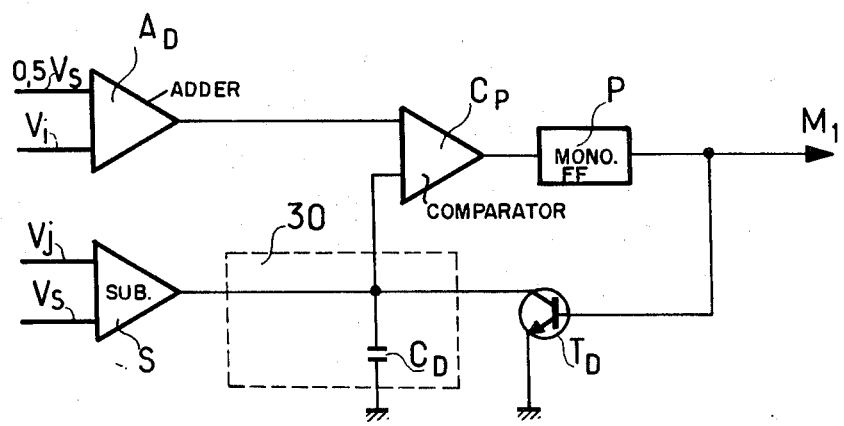
FIG. 7 is a schematic diagram of a modular element for function control.

One example of construction of the module $M_2$ which is capable of obtaining this law in an analogical manner is schematically shown in FIG. 7. It comprises an adding circuit $A_D$ receiving a signal $0.5 V_s$ and a signal $V_i$ on the inputs thereof and furnishing an output signal $0.5 V_s + V_i$. A subtractor circuit S derives from input signals $V_j$ and $V_s$ a difference signal $V_s - V_j$. This signal is applied to an integrator circuit 30 comprising a condenser $C_D$ which provides a sawtooth voltage signal with a slope $V_s - V_j$ at the terminals of $C_D$.

A comparator circuit $C_P$ receiving this sawtooth signal and the output signal of the circuit $A_D$ furnishes an output signal when the voltage at the terminals of $C_D$ is equal to the signal $0.5 k_s + k_i$. A monostable circuit P flip-flops in a manner such that the output voltage controls the unblocking of the transistor T of the module $M_1$. Simultaneously, the transistor T of the module $M_1$ passes into the state of conduction and discharges the condenser $C_D$ of the integrator 30.

Thanks to the module $M_2$, the transfer of the charges from condenser $C_i$ to condenser $C_j$ is made according to the desired law of time. In regulating the different parameters of the modules $M_1$ and $M_2$ it is possible to represent any state of traffic whatsoever in an analogical manner.

By virtue of the simulator according to the present invention it is thus possible to represent a complex network of intersecting roads and to simulate the circulation (plural in text) on these roads with cross-road traffic lights (it is sufficient to temporarily cut the connection between two consecutive condensers), the input and output flows, the derivations, the convergences, etc.

Depending upon the accuracy of the traffic analysis which is sought, the road sections will be shorter or longer. It is possible to attribute different characteristics to each section (speed, distance covered, capacity, saturation concentration).

The charge transfer module $M_1$ described hereinabove has been presented by way of example. Upon modifying the characteristics of the integrator, the temporal law of the charge transfers can be changed. One is complete master of the range of the times and is able to take the time reduction factor — with respect to the real time — which is desired, for example 1,000.

It is further possible to substitute for the module $M_2$ a computer furnishing any law that may be chosen.

The simulator according to the present invention can thus serve for analyzing traffic; for testing a method of regulation thereof, and even for carrying out the regulation thereof within the actual time.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What we claim is:

1. A method for simulating the traffic of motor vehicles on a path subdivided into sections comprising: selecting a condenser for each section having a capacity representative of the vehicle capacity of the corresponding section, charging each condenser with a charge representative of a desired number of vehicles in the corresponding section, connecting each condenser to the following condenser to represent said path, regulating the intensity of the electric current flowing from one condenser to the following condenser according to a predetermined law in dependence of the voltage of said one condenser and the voltage of said following condenser, measuring said electric current between two neighboring condensers and the voltage of each condenser thereby providing indications respectively of the rate of flow of vehicles and of the concentration of vehicles along the successive sections of the path.

2. A method as defined in claim 1 wherein the said relationship between voltage and current is the linear law:

$$Iij = AVi(Vs - Vj)$$

in which $Iij$ is the intensity of the current from one condenser $i$ to the following condenser $j$, A is a constant, $Vi$ and $Vj$ are the respective voltages of these two condensers $i$ and $j$, and Vs is a saturation voltage corresponding to the saturation concentration of said following section.

3. A method as defined in claim 1 wherein the said relationship between voltage and current is the hyperbolic law:

$Iij = b(Vi(Vs - Vj)/0.5 Vs + Vj)$ in which $Iij$ is the intensity of the current from one condenser $i$ to the following condenser $j$, $b$ is a constant, $Vi$ and $Vj$ are the respective voltages of the two condensers $i$ and $j$ and $Vs$ is a saturation voltage corresponding to the saturation concentration of said following section.

4. A method as defined in claim 1, wherein the said relationship between voltage and current is logarithmic and corresponds to the relationship of speed to concentration of the vehicles.

5. A system for simulating the traffic of motor vehicles on a network of roads in accordance with a linear relationship between the speed and the concentration of the vehicles, wherein each road is subdivided into sections, comprising:

a plurality of simulating capacitors, each simulating capacitor being provided for a respective section of road and having one of its terminals grounded, and charge transfer means connected between the other terminals of adjacent simulating capacitors for regulating the charging and discharging thereof in accordance with said linear relationship, wherein said charge transfer means includes a first voltage frequency converter furnishing a first frequency signal proportional to the voltage of one simulating capacitor, a first trigger circuit operatively connected to said first converter for providing an impulse signal calibrated to said first frequency signal, a first AND circuit having one input connected to the output of said first trigger circuit and a second input connected to a source of saturation voltage which is proportional to the saturation concentration of the following sections, the output of said first AND gate being connected through a resistor to the next simulating capacitor on the downstream side from said one simulating capacitor.

6. A system as defined in claim 5, wherein said charge transfer means further includes a second voltage frequency converter having one input connected to said next simulating capacitor and another input connected to said source of saturation voltage for producing a second frequency signal proportional to the difference between the said saturation voltage and the voltage of said next simulating capacitor, a second trigger circuit providing an input signal calibrated to said second voltage frequency, and a second AND circuit having one input connected to the output of said second trigger circuit and another input connected to said one simulating capacitor, the output of said second AND circuit being connected to ground.

7. A system for simulating the traffic of motor vehicles on a network of roads in accordance with a non-linear relationship between the speed and the concentration of the vehicles, wherein each road is subdivided into sections, comprising:

a plurality of simulating capacitors, each simulating capacitor being provided for a respective section of road and having one of its terminals grounded, and charge transfer means connected between the other terminals of adjacent capacitors for regulating the charging and discharging thereof in accordance with said non-linear relationship, wherein said charge transfer means includes first and second diodes connected in series between an upstream simulating capacitor and a downstream simulating capacitor and having the same direction of conduction from upstream to downstream, an amplifier having an input connected to said upstream simulating capacitor, a transistor having a collector electrode connected by way of a resistor to the output of said amplifier and an emitter electrode connected to ground, a further capacitor having a low capacity compared to said upstream and downstream simulating capacitors connected between the collector electrode of said transistor and a point between said first and second diodes, and control means connected to a base electrode of said transistor for controlling the conduction thereof in accordance with said non-linear relationship.

8. A system as defined in claim 7, wherein said control means is a function generator producing a signal having variations corresponding to the rhythm of the circulation to be simulated within the section, said signal being connected to the base electrode of said transistor.

* * * * *